Figure 1:
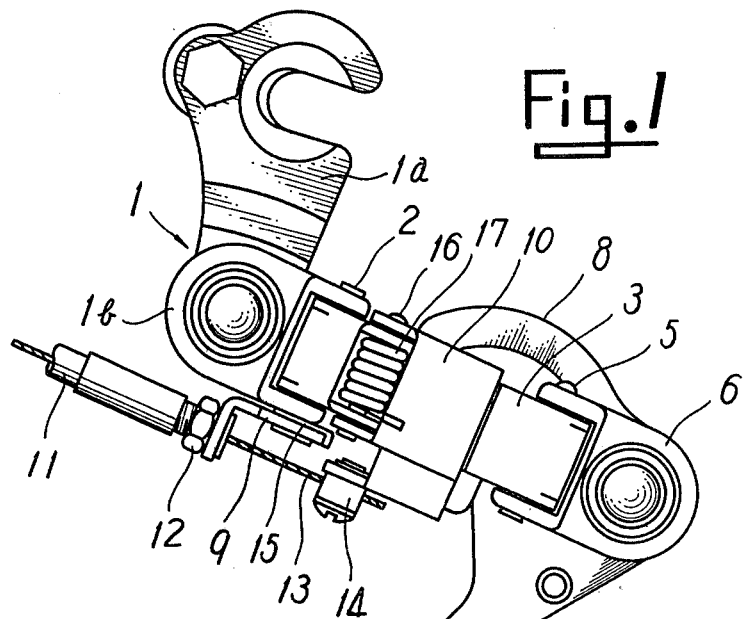

United States Patent [19]

Nagano et al.

[11] 4,241,617
[45] Dec. 30, 1980

[54] DERAILLEUR FOR A BICYCLE

[75] Inventors: Masashi Nagano; Hideaki Fujimoto, both of Sakai, Japan

[73] Assignee: Shimano Industrial Company Limited, Osaka, Japan

[21] Appl. No.: 729,015

[22] Filed: Oct. 4, 1976

[30] Foreign Application Priority Data

Oct. 13, 1975 [JP] Japan .................. 50-123478

[51] Int. Cl.³ .............................................. F16H 11/00
[52] U.S. Cl. ..................................... 474/82; 74/501 R
[58] Field of Search ...................... 74/217 B, 242, 473, 74/501 R

[56] References Cited

U.S. PATENT DOCUMENTS

| 609,570 | 8/1898 | Bowden | 74/501 R |
|---|---|---|---|
| 3,535,950 | 10/1970 | Shimano et al. | 74/473 |
| 3,896,679 | 7/1975 | Huret et al. | 74/217 B |
| 3,903,751 | 9/1975 | Dian | 74/217 B |
| 3,979,962 | 9/1976 | Kebsch | 74/217 B |
| 4,027,542 | 6/1977 | Nagano | 74/217 B |
| 4,030,375 | 6/1977 | Nagano | 74/217 B |

Primary Examiner—Samuel Scott
Assistant Examiner—Randall L. Green
Attorney, Agent, or Firm—Stevens, Davis, Miller & Mosher

[57] ABSTRACT

A derailleur for a bicycle, which is adapted to shift a driving chain to a selected one of two or more sprocket wheels by pushing or pulling a push-pull control wire. The derailleur is provided with at least one arm oscillating independently from a movable member in shifting one of the push-pull wire and an outer cable for the wire. The wire is secured to the arm and a spring is secured to the arm so that when the movable member is, in changing speed, loaded above a predetermined value, the arm is oscillated to prevent the wire from buckling. On the other hand, when the resistance is removed the energy stored in the spring by the oscillation of the arm allows the movable member to shift so that the driving chain may be shifted to a desired speed-changing stage.

7 Claims, 6 Drawing Figures

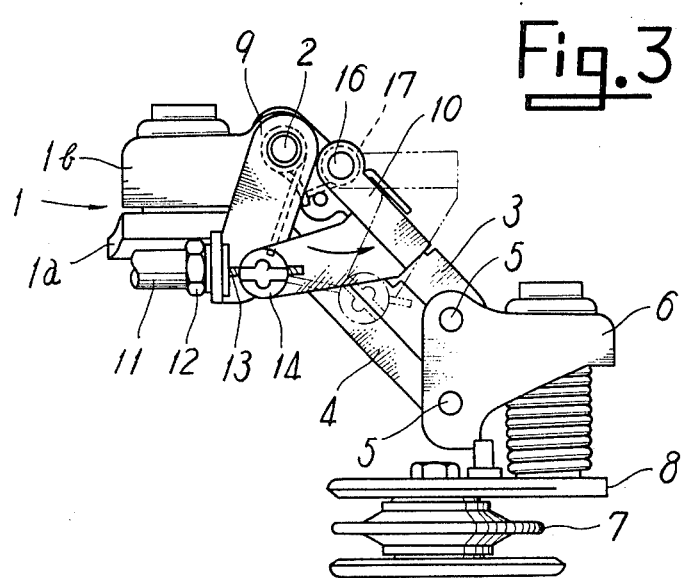
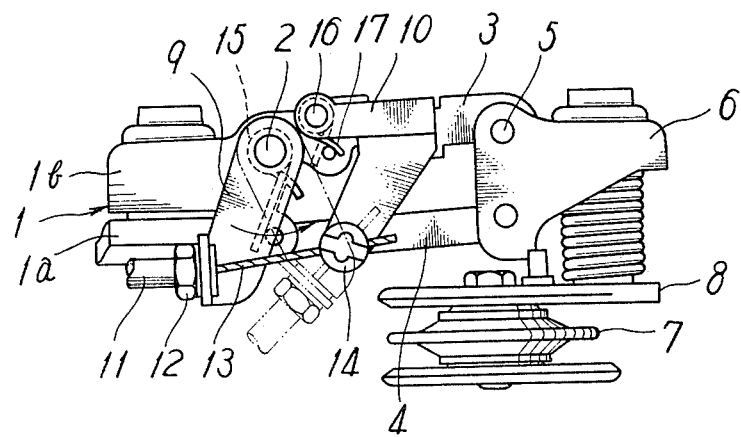

DERAILLEUR FOR A BICYCLE

This invention relates to a derailleur mainly attached to a rear wheel of a bicycle for changing the bicycle speed.

Conventionally, this kind of derailleur is adapted to support a movable member having a chain guide cage to a fitting member in oscillatable relation with respect thereto through linkage members. The movable member is provided with a return spring so as to always be urged toward one side, and shifted to the other side against the spring by pulling an inner wire, and then restored to its original position by the restorative force of the spring.

The derailleur is used for keeping the desired speed-changing stage in such a manner that a control lever for changing the speed to high is applied with a rotative resistance, such as frictional resistance, so that the chain guide cage may be kept in a fixed position.

Therefore, the derailleur should always be operated not only by a force greater than the rotative resistance but by a force which is greater than the sum of the rotative resistance and the force to overcome the spring force when operated against the spring. As a result, there is a problem in that the lever becomes hard to operate.

Besides that, there is provided a derailleur which is, as shown in U.S. Pat. No. 3,453,899, provided with two control wires instead of the aforesaid return spring so that one of the wires is pulled to shift the chain guide cage from the low speed stage to the high speed stage and the other is pulled to shift the chain guide cage from the high speed stage to the low speed stage. Such derailleur solves the aforesaid problem because the use of two wires makes the lever easy to operate. On the other hand, this derailleur is structurally complicated and needs two wires. As a result, the derailleur requires complex adjustment of the wires and is expensive to manufacture.

In U.S. Patent application Ser. No. 706,372, filed July 19, 1976 corresponding to Japanese Patent Application No. Sho 50-94,647, there is described a newly developed derailleur which is adapted to be used for changing the speed with a single control wire and which has solved the aforesaid problem.

However, even that derailleur presents difficulties when operated when the freewheel is not rotating because the chain guide cage is locked in contact with the freewheel and is not further shiftable so as to possibly impart a large stress on the inner wire. As a result, the derailleur has a problem in that the wire buckles when pushed into the above condition.

Moreover, once bucking has occurred it remains, causing the speed-change to malfunction unless adjustments are made.

The above problem can be solved by fully training a user not to operate the derailleur when the freewheel is not rotating. However such training is difficult. Also, an unskilled person occasionally carelessly operates the derailleur. As a result, a complete solution to the above problem has not been found.

In view of the aforesaid problem, the present invention has been designed to overcome these difficulties. An object of the invention is to provide a derailleur such that even if pulled or pushed, especially pushed, by operating the lever during the time the freewheel is not rotating, the wire is never bent out or buckled.

In greater detail, the invention is directed to provide a derailleur having at least one arm pivoted to one of four members: a fitting member, a pair of linkage members and a movable member. A first retainer on the arm retains either the push-pull wire or an outer cable for the wire so that the arm may, when the wire is pushed, swing independently from the movable member. Also, the arm is provided with at least one spring urging the arm toward one of the four members. The spring has a biasing force which is larger than the resistance against shifting of the movable member for changing the speed. The biasing force is under the buckling limit of the wire when the movable member is, in pushing the wire for changing thes peed, subject to a stress larger than the aforesaid resistance.

The invention is characterized in that when the wire is pushed to control the derailleur, a large resistance imparted to the movable member against its shifting due to the non-rotation of the freewheel, causes the arm to swing against the spring so that the wire may be prevented from being bent out or buckled. Namely, in comparison with a conventional derailleur such that the push-pull wire and outer cable are retained to the two relative movable members among the four members through a first and a second retainer respectively, the derailleur of the invention is adapted to make at least one of the two retaining positions shiftable, thereby preventing buckling of the wire. Also, the arm is shiftable against the spring force as previously explained and the spring is energized by the arm which is shiftable when the movable member is, in changing the bicycle speed, biased with a high force during such speed change. The stored energy in the spring enables the movable member to be shifted to the desired speed-changing stage when the aforesaid high force is removed.

Figure 2:
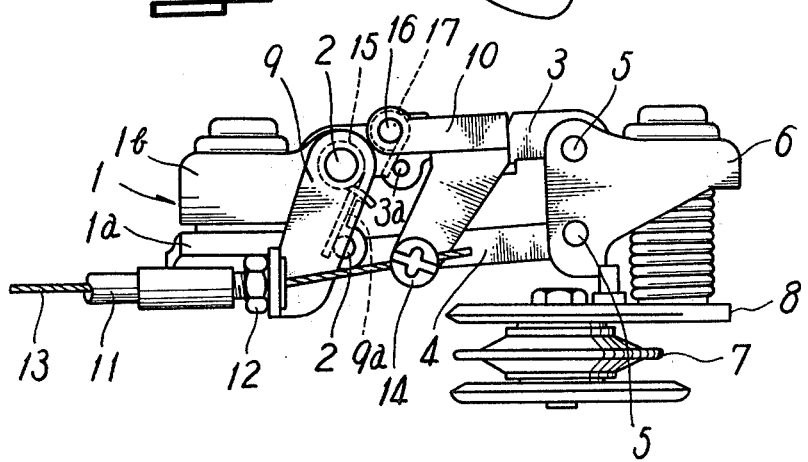
Figure 5:
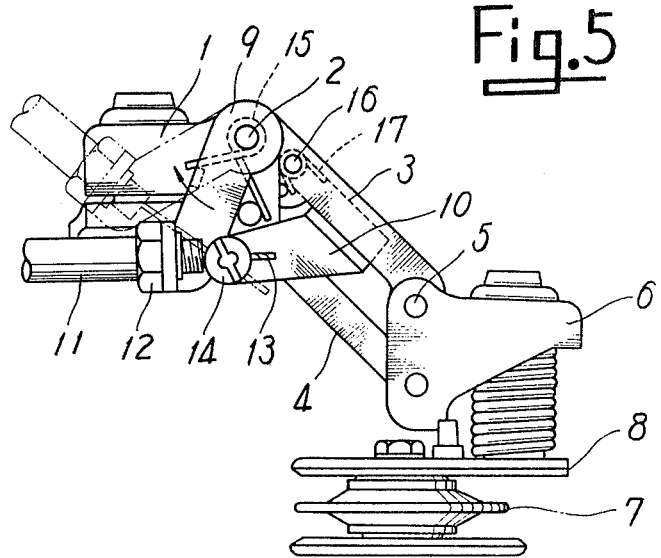
Figure 6:
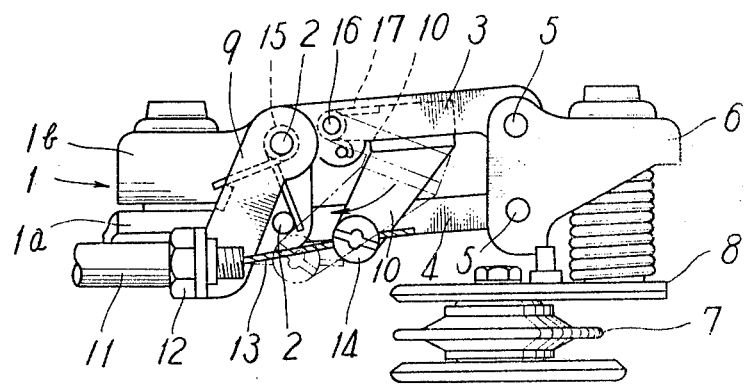

These and other objects and novel features of the invention will be more apparent from th following detailed description and drawings, in which:

FIG. 1 is a front view showing a typical embodiment of the derailleur of the invention, FIG. 2 is a bottom plan view thereof, FIGS. 3 and 4 are bottom plan views showing the function of the derailleur in FIG. 1, and FIGS. 5 and 6 are bottom plan views showing a modified embodiment of the invention in its function corresponding to that of FIGS. 3 and 4.

Referring to the drawings, all derailleurs are mounted to the rear wheel on the same side as the multistage freewheel. Those mounted adjacent the front crank are onthe same side as the plurality of front chain gears.

The derailleur shown in the drawings comprises a fitting member 1 comprising a bracket 1a fixed to the bicycle frame (not shown) and a body 1b rotatably supported thereto only in a given range, two parallel linkage members 3 and 4 mounted to the fitting member 1 through pins 2, and a movable member 6 carried with the linkage members 3 and 4 through pins 5. The movable member supports therewith a chain guide cage 8 having two chain guide pulleys 7.

The aforesaid construction is not at all different from that of a conventional derailleur, in which the movable member 6 is shiftable axially of sprockets of the freewheel (not shown) with respect to the fitting member 1. The movable member shifts from the low speed sprocket to the high speed sprocket and vice versa.

The derailleur of the invention is made approximately equal in its resistance against shifting of the movable member from the low speed stage to the high and vice versa. In other words, the movable member 6 is freely reciprocable in the absence of the return spring used in the conventional derailleur.

The fitting body 1b is provided with a first arm 9 of a plate member and the outside linkage member 3 of the pair of linkage members is provided with a second arm 10 extending toward the inside linkage member 4 in swinging relation therewith. The first arm 9 is provided at its tip with a first retainer 12 for securing therewith a terminal of the outer cable 11. The second arm 10 is similarly provided with a second retainer 14 for the inner wire 13. The second retainer 14 is positioned in linear opposition to the first retainer 12 so that the terminal of the inner wire 13 may be retained and aligned with an extension line of the axis of the outer cable 11.

The first arm 9 is pivoted to the fitting body 1b by use of a pivot 2 for the outside linkage 3. A first coil spring 15 is wound around the pivot 2. Both ends of the spring 15 are seated on a nose 9a formed on the first arm 9, so that the first arm 9 is always urged toward the fitting member 1, that is the first retainer 12 on the first arm 9 is urged in a direction away from the second retainer 14.

The second arm 10 is nearly L-like shaped and pivoted at its base to the linkage member 3 through a pivot 16 in a position close to the pivot of the first arm 9. The second arm 10 is pivoted so that the second retainer 14 formed at the arm 10 may be movable along the extension line of the axis of the outer cable 11. Around the pivot 16 is wound a second coiled spring 17. One end of the spring 17 is engaged with a pin 3a formed on the outside linkage member 3 and the other end is engaged with the outer surface of the second arm 10 for always urging the second arm 10 toward the linkage member 3, that is, the base of the second arm 10 abuts the outer surface of the outside linkage member 3, so that the second retainer 14 may be directed to approach the first retainer 12.

The first and second springs 15 and 17 provided at the first and second arms 9 and 10 have a spring force which is larger than the resistance against shifting of the movable member 6 and smaller than the buckling limit of the inner wire 13 respectively. In greater detail, the movable member 6 is normally shifted through the linkage members 3 and 4 in the absence of actions of the first and second arms 9 and 10, thereby exerting the desired speed-change. However, a resistance greater than the aforesaid resistance against shifting of the movable member is applied thereto due to the cessation of rotation of the sprocket. When that occurs one of the first and second arms 9 and 10 swings prior to buckling of the inner wire 13, that is, the arm 10 swings when the wire 13 is pushed and the arm 9 swings when the wire is pulled as shown in FIGS. 1 through 4 respectively, so as to vary the interval between the first retainer 12 for the outer cable 11 and the second retainer 14 for the inner wire 12 while leaving the movable member 6 stationary. Thus the inner wire 13 is prevented from buckling. Furthermore, both the springs serve as the savers to be hereinafter described and allow the movable member to shift to the desired speed-changing stage by means of the energy stored in the spring when the aforesaid excess resistance is removed from the movable member, thereby changing the bicycle speed.

Now, the operation of the aforesaid derailleur for changing the bicycle speed by pushing or pulling the inner wire 13, the actions of the arms 9 and 10 and the functions of the springs 15 and 17, will be detailed in the following description in accordance with FIGS. 3 and 4.

The derailleur in FIG. 3 represents a state in which the driving chain is shifted to the low speed stage by pulling the inner wire 13. The chain is shifted from the low speed stage to the high speed stage by pushing the inner wire 13. In this instance, the second arm 10 is shifted from the solid line position in the drawing and follows the shifting of the linkage members 3 and 4. No shifting of the arm 10 occurs with respect to the outside linkage member 3. However, when the inner wire is pushed when the freewheel is not rotating and the chain is not moving, the chain guide pulleys 7 are restrained from shifting by the stopped chain to impart a large resistance to shifting of the movable member 6. Accordingly, the stiffness of the inner wire 13 is, when further continuously pushed in this condition, overcome by the pushing stress and could buckle. However, at this time, the inner wire 13 pushed with a force over the predetermined force, allows, prior to its buckling, the second arm 10 to oscillate, as shown with the dotted line in FIG. 3, against the spring 17 so that the interval between the first retainer 12 for the outer cable and the second arm 14 for the inner wire is enlarged for preventing the inner wire 13 from buckling. Furthermore, the stored energy in the spring 17 resulting from the above oscillation of the second arm 10 can, when the resistance applied to the movable member is removed therefrom, i.e., when the driving chain starts to travel, shift the movable member 6, thereby shifting the chain to the desired speed-changing stage.

Next, the speed change by pulling the wire will be described.

The derailleur with which the driving chain is shifted from the low speed stage to the high speed stage is shown in FIG. 4. The derailleur is restored from this state to that in FIG. 3 by pulling the inner wire 13. In this instance, the first arm 9 is kept in the position shown in solid lines in FIG. 4 and the inner wire 13 is pulled to shift the linkage members 3 and 4 through the second arm 10 thereby to shift the movable member 6 to the low speed stage.

When the inner wire 13 is pulled for changing the speed and the multistage freewheel is not rotating and the driving chain is not moving the chain guide pulleys 7 are, as with the aforesaid pushing action locked with the stopped chain so that the movable member 6 is greatly restrained from shifting. In this instance, the first arm 9 swings against the spring 15 as shown with the dotted line in FIG. 4 so as to move the first retainer 12 for the outer cable 11 close to the second retainer 14 for the inner wire 13. Thus, the first arm 9 swings to energize the spring 15 so that the stored energy in the spring shifts the movable member 6 to the high speed stage when the rsistance against shifting of the movable member is removed therefrom, thereby shifting the chain to the desired speed-changing stage.

Although the aforesaid construction of the derailleur includes the first and the second arms 9 and 10 having the first and the second retainers 12 and 14 for retaining therewith terminals of the outer cable 11 and inner wire respectively, only one of the arms 9 and 10 maybe provided. A retainer for retaining therewith either the push-pull inner wire 13 or the outer cable 11 may be mounted to, for example, a fixed position on the fitting member 1 so that the arm may be oscillated only by pushing the wire. In this instance, the arm may be provided on any one of four members: the fitting member 1, the linkage members 3 and 4, and the movable member 6. It is sufficient that the spring is engaged at its one end with the arm and at the other end with any one of the four members so as to urge the arm toward the one member.

In addition, both the first and the second arms 9 and 10 may, as shown in FIG. 5, be mounted on the derailleur to rotate clockwise so that, when the chain guide cage 8 is locked, and the inner wire is pushed, the first arm 9 may, as shown by the phantom line in FIG. 5, be oscillated to prevent the inner wire 13 from buckling.

In this case, when the inner wire is pushed, the first arm 9 swings to energize the spring 15 attached thereto. When the inner wire is pulled, the second arm 10 swings as shown in FIG. 6, due to the locked chain guide cage 8, so as to energize the spring 17 attached to the second arm 10.

Although as described above, the first arm 9 is pivoted to the fitting member 1 and the second arm 10 is pivoted to the one linkage member 9, the first arm 9 can be pivoted to either one of the linkage members 3 and 4, or the movable member 6 and the second arm 10 can be pivoted to the fitting member 1, the linkage member 4 or the movable member 6.

In brief, it is sufficient that the first spring 15 of the two springs is inserted between the first arm 9 and one of the four members, to which the arm is pivoted, so that the first arm 9 is urged toward the one member, and that the second spring 17 is inserted between the second arm 10 and one of the movable members, i.e., one of the linkage members 3 and 4 or the movable member 6, among the four members.

The first retainer 12 on the first arm 9 retains the outer cable 11 therewith and the second retainer 14 retains the push-pull wire 13. However, both retainers may be alternated respectively.

As clearly understood from the abovementioned description, the single inner wire, which is pushed or pulled for changing the speed, is sufficient so that the derailleur of the invention is simple in construction and inexpensive to manufacture in comparison with the conventional one having two control wires for changing the speed. Furthermore, no return spring is required while the single wire is used so that the control lever, which is not necessary to be applied with a frictional resistance overcoming the return spring force, can be lightly operated for changing the speed.

In addition, when the driving chain stops travelling due to the cessation of rotation of the multistage freewheel corresponding to the derailleur or the multistage front chain gear, that is, when the crank stops it rotation, the inner wire will not buckle even if it is forcibly pushed. Furthermore, when the crank starts to rotate to allow the driving chain to travel, the driving chain can automatically be shifted to the desired speed-changing stage corresponding to the extent of displacement of the arm for preventing the wire from buckling.

It is further understood by those skilled in the art that the foregoing description is a preferred embodiment of the disclosed device and that various changes and modifications may be made in the invention without departing from the spirit and scope thereof.

What is claimed is:

1. A derailleur for a bicycle, which is adapted to change the speed of the bicycle by shifting without spring bias a driving chain to one of two or more sprockets by pushing a push-pull control wire from a large diameter sprocket to a smaller diameter sprocket, said derailleur comprising:

four members including a fitting member, a pair of linkage members, and a movable member;
   said linkage members being freely oscillatably supported by said fitting member, said movable member being freely oscillatably supported by said linkage members and having a chain guide means for guiding the driving chain onto one of the sprockets to thereby be shiftable axially of the sprockets with respect to said fitting member;
   a first arm pivoted to one of said four members;
   a first retainer on one end of said arm for retaining an end portion of one of a control wire or an outer cable therefor so that when the control wire is pushed said arm may pivotally move independently of any shifting of the movable member;
   at least one spring for biasssing said first arm toward one of said four members, said spring having a biassing force which is greater than a resistive force imparted to said movable member against shifting for changing the speed of the bicycle and less than the force required to buckle the control wire when pushed for changing the speed of the bicycle from a large diameter sprocket to a smaller diameter sprocket and to produce a force greater than the resistive force imparted to said movable member against shifting;
   a second arm pivoted to one other of said four members;
   a spring for biassing said second arm toward said one other of said members; and
   a second retainer on said second arm for retaining an end portion of the other one of the control wire or the outer cable therefor, said second arm being mounted to one of said four members which is movable relative to said one member toward which said first arm is biassed.

2. The derailleur according to claim 1, wherein said first-mentioned spring is between said first arm and the one of said four members to which said first arm is pivoted, so that said first arm is urged toward said one of said four members to which said first arm is pivoted, and said second spring is between said second arm and one of said linkage members and said movable member.

3. The derailleur according to claim 2, wherein said second spring is between said second arm and one of said linkage members so that said second arm may be urged toward said one of said linkage members.

4. The derailleur according to claim 2, wherein said second spring is between said second arm and said movable member so that said second arm may be urged toward said movable member.

5. The derailleur according to claim 1, wherein said push-pull wire is retained at its end portion by said first retainer and said outer cable is retained at its end portion by said second retainer.

6. The derailleur according to claim 1, wherein said outer cable is retained at its end portion by said first retainer and said push-pull wire is retained at its end portion by said second retainer.

7. A derailleur for a bicycle, which is adapted to change the speed of the bicycle by shifting without spring bias a driving chain to one of two or more sprockets by pushing a push-pull control wire having an outer cable therefor from a large diameter sprocket to a smaller diameter sprocket, said derailleur comprising:

four members including a fitting member, a pair of linkage members, and a movable member;

said linkage members being freely oscillatably supported by said fitting member, said movable member being freely oscillatably supported by said linkage members and having a chain guide means for guiding the drive chain onto one of the sprockets to thereby be shiftable axially of the sprockets with respect to said fitting member;

a first arm pivoted to a first one of said four members;

a second arm pivoted to a second one of said four members other than said first member;

a first retainer on one end of said first arm for retaining an end portion of the control wire or the outer cable therefor;

a second retainer on one end of said second arm for retaining an end portion of the other one of the control wire or the outer cable therefor;

a first spring for biassing said first arm toward said first member, said spring having a biassing force less than the force required to buckle the control wire when pushed for changing the speed of the bicycle from a large diameter sprocket to a smaller diameter sprocket; and a second spring for biassing said second arm toward said second member.

* * * * *